United States Patent [19]

Allcock et al.

[11] Patent Number: 5,093,438

[45] Date of Patent: Mar. 3, 1992

[54] POLYCARBOPHOSPHAZENES

[75] Inventors: Harry R. Allcock; Ian Manners; Gerhard Renner, all of State College, Pa.; Oskar Nuyken, Munich, Fed. Rep. of Germany

[73] Assignee: The Pennsylvania Research Corporation, University Park, Pa.

[21] Appl. No.: 547,708

[22] Filed: Jul. 3, 1990

[51] Int. Cl.$^5$ ............................................. C08F 283/00
[52] U.S. Cl. .................................... 525/538; 528/399
[58] Field of Search ......................... 525/538; 528/399

[56] References Cited

U.S. PATENT DOCUMENTS 4,242,499  12/1980  Allcock et al. ...................... 528/399
4,267,311   5/1981  Elefritz, Jr. .......................... 528/399

Primary Examiner—Melvyn I. Marquis
Attorney, Agent, or Firm—Thomas J. Monahan

[57] ABSTRACT

The synthesis of a new class of macromolecules, the polycarbophosphazenes, is reported. When heated at 120° C., the cyclocarbophosphazene $N_3P_2CCl_5$ undergoes ring-opening polymerization to afford the high polymeric polycarbophosphazene $[N_3P_2CCl_5]_n$. The latter functions as a reactive macromolecular intermediate and undergoes halogen replacement with sodium phenoxide or aniline to afford the hydrolytically stable derivatives $[N_3P_2C(OPh)_5]_n$ and $[N_3P_2C(NHPh)_5]_n$.

3 Claims, No Drawings

POLYCARBOPHOSPHAZENES

The synthesis of macromolecules that contain inorganic elements in the polymer backbone is currently an area of intense investigation. [(Allcock, H. R.; *Chem. Eng. News.* 1985, 63(11), 22); (Zeldin, M.; Wynne, K. J.; Allcock, H. R.; Eds. "Inorganic and Organometallic Polymers"; ACS Symp. Ser., 1988, 360); (Bianconi, P. A.; Weidman, T. W.; *J. Am. Chem. Soc.* 1988, 110, 2343-2344); (Kanatzidis, M. G.; Huang, S.; *J. Am. Chem. Soc.* 1989, 111, 760-761); (Bowden, M. J.; Turner, R.; Eds. "Electronic and Photonic Applications of Polymers"; Adv. Chem Ser. 1988, 218); (Hastings, G. W.; Ducheyne, P.; "Macromolecular Biomaterials", CRC Press, 1984); (Wynne, K. J.; Rice, R. W.; *Ann. Rev. Mater. Sci.* 1984, 14, 297)]. This is a consequence of the need for polymers that have unusual electrical, optical, thermal, or biomedical characteristics, or which function as precursors to ceramic materials. In principle, the ring-opening polymerization of cyclic inorganic compounds is an attractive route to new macromolecular species. However, relatively few examples of the successful use of this approach have been reported. [Allcock, H. R.; *Chem. Eng. News.* 1985, 63(11), 22.]

Cyclic phosphazenes are some of the best studied examples of polymerizable inorganic ring systems. Thus, many halogenated and organo-halogenated cyclotriphosphazenes have been shown to undergo thermal ring-opening polymerization to corresponding macromolecules.

An example of such thermal ring-opening polymerization can be depicted with the halogenated cyclotriphosphazene according to formula 1 which, after ring-opening, forms the macromolecule monomer of formula 2 with a backbone of alternating phosphorus and nitrogen atoms:

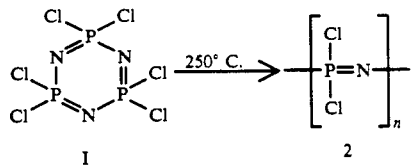

in which n indicates a repeating monomeric unit.

This reaction has been well documented. [(Allcock, H. R.; *Chem. Eng. News.* 1985, 63(11), 22); (Allcock, H. R.; "Phosphorus-Nitrogen Compounds", Academic Press, New York, 1972); (Allcock, H. R.; *Angew. Chem. Int. Ed. Eng.* 1977, 16, 147); (Zeldin, M.; Wynne, K. J.; Allcock, H. R.; Eds. "Inorganic and Organometallic Polymers"; ACS Symp. Ser., 1988, 360, 250-282)]. Replacement of the halogen atoms in compound 2 by organic or organometallic units has provided access to a broad range of stable and useful materials. [Allcock, H. R.; *Chem. Eng. News.* 1985, 63(11), 22].

Although the polymerization of macromolecules derived from cyclotriphosphazenes are known, it has previously been unreported, prior to the making of the present invention, that cyclic compounds containing phosphorus, nitrogen and a third heteroatom may also form polymerizable macromolecules.

It is, therefore, the prime aspect of the present disclosure to describe the first ring-opening polymerization of a specie of cyclic phosphazene compounds that contain a skeletal carbon atom in addition to phosphorus and nitrogen. More specifically, as depicted in the following flow schematic, the present invention describes the ring-opening of a cyclocarbophosphazene according to formula 3 to form a polymerizable macromolecule 4 monomer in which n represents a repeating monomeric unit.

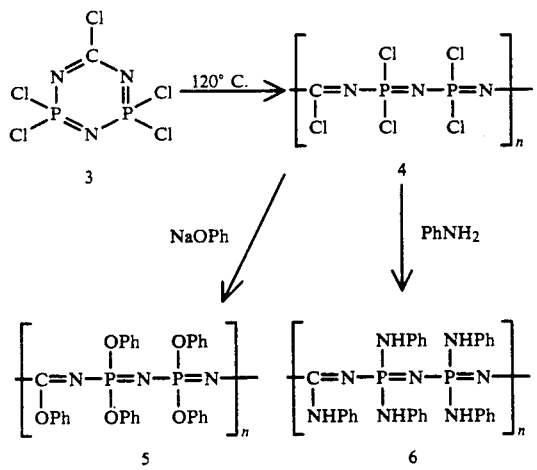

When the cyclocarbophosphazene of formula 3 [The white, crystalline cyclocarbophosphazene can be synthesized in four high yield steps from $NH_4Cl$, $PCl_5$, $S_8$, $S_2Cl_2$, and $Cl_2$ by the method of Fluck, E.; Schmid, E.; Haubold, W.; *Z. Naturforsch.* 1975, 30b, 808-809.] was heated over a 4 h period in the molten state at 120° C. in an evacuated glass-tube, a gradual increase in viscosity was noted. Analysis by $^{31}P$ NMR [NMR spectra were recorded in THF (unless otherwise stated) on either a Bruker WP-360 or a JEOL FX-90 Q spectrometer. Chemical shifts are relative to 85% $H_3PO_4$ ($^{31}P$), TMS ($^1H$), THF-$d^8$ or $CDCl_3$ ($^{13}C$)] showed that the products consisted of unreacted cyclocarbophosphazene (ca 5%) and the polycarbophosphazene of formula 4 (ca 95%). The $^{31}P$ NMR spectrum of the polycarbophosphazene comprised a singlet resonance at −3.7 ppm which is significantly shifted to high field compared to that of the starting cyclocarbophosphazene (delta=36.5 ppm). A similar shift of the $^{31}P$ NMR resonance is observed in the formation of $[NPCl_2]_n$ (delta=−18.4 ppm) from $[NPCl_2]_3$ (delta=19.9 ppm). The $^{13}C$ NMR spectrum of the polycarbophosphazene contained a singlet (delta=154.5 ppm) assigned to the carbon atoms of the polymer backbone. Because of the sensitivity of this compound to moisture, further characterization was carried out after conversion to the hydrolytically stable aryloxy and amino derivatives, according to formula 5 and 6, respectively.

The polymeric monomer according to general formula 4 was prepared from 1.0 gram (3.4 mmol) which was polymerized thermally at 120° C. to yield a 95% conversion to the monomer.

Following treatment with excess sodium phenoxide (THF, 25° C., 12 h), the aryloxy polymer according to formula 5 was isolated as a white, fibrous material after precipitation from THF sequentially into water (to remove NaCl and excess NaOPh) and hexanes [yield 1.32 g (70%)].

[$^{31}P$ NMR delta=10.4 s. $^1H$ NMR (in $CDCl_3$) delta=6.9 br, s. $^{13}C$ NMR (in $CDCl_3$) delta=121.2 (o-PhOP), 122.6 (o-PhOC), 123.9 (p-PhOP), 124.1 (p-PhOC), 128.3 (m-PhOC), 129.0 (m-PhOP), 151.4 (ipso- PhOP), 153.2 (ipso-PhOC), 159.8 (NCN) all s; IR 1380 (s, $\nu$(C=N)), 1300 cm$^{-1}$ (s. $\nu$(P=N)); Analysis, Theory C 64.02, H 4.34, N 7.23, Cl 0.00 Found C 63.33, H 4.15, N 7.38, Cl 0.01%; DSC $T_g$=18° C.; GPC, single peak, $M_w$=1.5×10$^5$].

Following treatment with excess aniline (THF, 50° C., 96 h), the polymeric monomer was isolated as a white powder after precipitation from THF into hexanes (yield, 55%).

[$^{31}$P NMR delta=−9.1 br, s. $^1$H NMR (in CDCl$_3$) delta=6.8 br, s (Ph), 3.6 br, s (NH). $^{13}$C NMR (in THF-d$^8$) delta=118.9 (o-PhO), 121.3 (p-PHO), 129.5 (m-PhO), 142.0 (ipso-PhO), 157.2 (NCN) all br s; IR 3200 (br, $\nu$(N-H)), 1390 (s, $\nu$(C=N), 1250 cm$^{-1}$ (s, $\nu$(P=N)); Analysis, Theory C 64.56, H 5.25, N 19.44, Cl 0.00, Found C 63.83, H 5.26, N 19.09, Cl 0.48%; DSC, $T_g$=112° C.; GPC, single peak, $M_w$=3.1×10$^5$].

These macromolecules are stable in the atmosphere, and yield films (formula 5) or glasses (formula 6) that superficially resemble organic polymers. Characterization was achieved by $^{31}$P, $^{13}$C, and $^1$H NMR spectroscopy, infrared spectroscopy, elemental analysis, differential scanning calorimetry, and gel permeation chromatography.

The polycarbophosphazenes of general formulae 4, 5 and 6 represent the first examples of a macromolecular hybrid of polyphosphazenes. In principle, a broad range of polymers of this type should be accessible via replacement of the halogen (although general formula 4 as depicted indicates the chlorine moiety, this moiety may be exchanged for other halogen atoms) of the reactive macromolecular intermediate according to general formula 4 by other nucleophiles.

Thus, while we have illustrated and described the preferred embodiment of our invention, it is to be understood that this invention is capable of variation and modification, and we, therefore, do not wish or intend to be limited to the precise terms set forth, but desire and intend to avail ourselves of such changes and modifications which may be made for adapting the present invention to various usages and conditions. Accordingly, such changes and modifications are properly intended to be within the full range of equivalents and, therefore, within the purview of the following claims. The terms and expressions which have been employed in the foregoing specification are used therein as terms of description and not of limitation, and thus there is no intention, in the use of such terms and expressions, of excluding equivalents of features shown and described, or portions thereof, it being recognized that the scope of the invention is defined and limited only by the claims which follow.

Having thus described our invention and the manner and process of making and using it in such full, clear, concise, and exact terms so as to enable any person skilled in the art to which it pertains, or to with which it is most nearly connected, to make and use the same.

What is claimed is:

1. A polycarbophosphazene macromolecule of the formula:

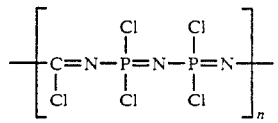

wherein Cl represents a halogen moiety and n indicates a repeating monomeric unit.

2. A macromolecular monomer of the formula:

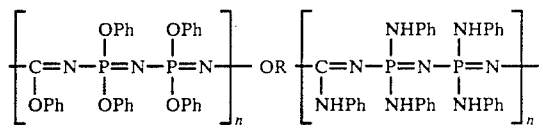

wherein n indicates a repeating monomeric unit.

3. A method for the manufacture of a polymer having a macromolecular monomeric unit selected from the group consisting of:

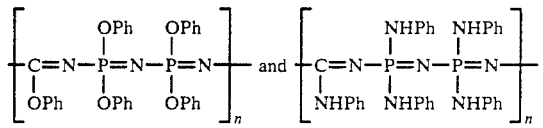

which comprises:
   a. heating a cyclocarbophosphazene over a sufficient period of time at a temperature of about 120° C. to form a polycarbophosphazene; and
   b. reacting said polycarbophosphazene with an excess of a compound selected from the group consisting of sodium phenoxide and aniline; and
   c. Producing

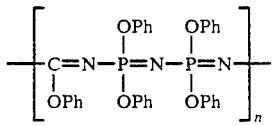

when said polycarbophosphazene reacts with sodium phenoxide, and producing

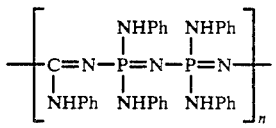

when said polycarbophosphazene reacts with aniline.

* * * * *